(12) United States Patent
Smadi

(10) Patent No.: US 9,148,499 B2
(45) Date of Patent: Sep. 29, 2015

(54) METHOD AND SYSTEM FOR AUTOMATICALLY IDENTIFYING VOICE TAGS THROUGH USER OPERATION

(71) Applicant: Research In Motion Limited, Waterloo (CA)

(72) Inventor: Mohammed Nawaf Smadi, Ancaster (CA)

(73) Assignee: BlackBerry Limited, Waterloo (CA)

( * ) Notice: Subject to any disclaimer, the term of this patent is extended or adjusted under 35 U.S.C. 154(b) by 325 days.

(21) Appl. No.: 13/746,381

(22) Filed: Jan. 22, 2013

(65) Prior Publication Data

US 2014/0207466 A1    Jul. 24, 2014

(51) Int. Cl.
| | |
|---|---|
| *G10L 21/00* | (2013.01) |
| *G10L 25/00* | (2013.01) |
| *G10L 15/18* | (2013.01) |
| *G10L 15/00* | (2013.01) |
| *H04M 1/27* | (2006.01) |
| *G10L 15/22* | (2006.01) |

(52) U.S. Cl.
CPC .............. *H04M 1/271* (2013.01); *G10L 15/22* (2013.01); *H04M 2250/74* (2013.01)

(58) Field of Classification Search
CPC ....... G10L 15/22; G10L 15/265; G06F 3/167; H04M 2201/40
USPC ......................................... 704/275, 231, 257
See application file for complete search history.

(56) References Cited

U.S. PATENT DOCUMENTS

| | | | |
|---|---|---|---|
| 5,042,063 A | 8/1991 | Sakanishi et al. | |
| 5,835,570 A | 11/1998 | Wattenbarger | |
| 6,041,300 A | 3/2000 | Ittycheriah et al. | |
| 6,370,237 B1 * | 4/2002 | Schier | 379/88.03 |
| 6,404,876 B1 * | 6/2002 | Smith et al. | 379/218.01 |
| 6,584,439 B1 * | 6/2003 | Geilhufe et al. | 704/270 |
| 6,711,543 B2 | 3/2004 | Cameron | |

(Continued)

FOREIGN PATENT DOCUMENTS

| | | |
|---|---|---|
| GB | 2359457 | 8/2001 |
| WO | 00/58944 | 10/2000 |
| WO | 2006/101673 | 9/2006 |

OTHER PUBLICATIONS

Extended European Search Report dated May 17, 2013 for corresponding European Patent Application No. 13152205.4.

(Continued)

*Primary Examiner* — Jesse Pullias
(74) *Attorney, Agent, or Firm* — Ridout & Maybee LLP

(57) ABSTRACT

A method for automatically identifying voice tags on an electronic device. After failure to initiate a communication using a voice input command, the user may then subsequently contact the recipient using an application program of the electronic device. The original audio of the voice input command may be identified as a potential voice tag for the now-identified recipient. The method includes: receiving, through a voice interface program, a voice input command, the voice input command including a command element and a content element; ending the voice interface program without performing the voice input command; receiving, through an application program, a user input which identifies data for executing an application program command; performing the application program command; and identifying audio of the content element as a voice tag associated with the data identified by the user input.

27 Claims, 6 Drawing Sheets

(56) References Cited

U.S. PATENT DOCUMENTS

| | | | |
|---|---|---|---|
| 6,839,670 B1 | 1/2005 | Stammler et al. | |
| 7,050,976 B1 | 5/2006 | Packingham | |
| 7,117,159 B1 | 10/2006 | Packingham et al. | |
| 7,164,934 B2 | 1/2007 | Malizia-Hoyt et al. | |
| 7,269,563 B2 | 9/2007 | Douros | |
| 7,469,210 B1 | 12/2008 | Kittrell et al. | |
| 7,529,677 B1 * | 5/2009 | Wittenberg | 704/275 |
| 7,881,932 B2 | 2/2011 | Muschett | |
| 2002/0010005 A1 | 1/2002 | Hwang et al. | |
| 2003/0007609 A1 | 1/2003 | Yuen et al. | |
| 2004/0234047 A1 * | 11/2004 | Ciccarelli et al. | 379/88.16 |
| 2006/0215821 A1 | 9/2006 | Rokusek et al. | |
| 2007/0047719 A1 | 3/2007 | Dhawan et al. | |
| 2007/0136069 A1 | 6/2007 | Veliu et al. | |
| 2008/0240377 A1 | 10/2008 | Lee | |
| 2009/0196404 A1 | 8/2009 | Chou | |
| 2010/0169098 A1 * | 7/2010 | Patch | 704/275 |
| 2012/0271639 A1 | 10/2012 | Hanson | |

OTHER PUBLICATIONS

ASR on the fly; Muraskin, Ellen; Communications Convergence 10.8 (Aug. 2002) 42. Source: ProQuest Technology Collection.

Diversified users' satisfaction with advanced mobile phone features; Chen, Ling; Hwang, Wonil; Salvendy, Gavriel. Universal Access in the Information Society5.2 (Aug. 2006) 239-248. Source: ProQuest Technology Collection.

* cited by examiner

METHOD AND SYSTEM FOR AUTOMATICALLY IDENTIFYING VOICE TAGS THROUGH USER OPERATION

TECHNICAL FIELD

Example embodiments relate to the field of voice-based communications with electronic devices.

BACKGROUND

Voice recognition engines are used to translate spoken words into text, in order to execute desired user commands. Example voice recognition applications include voice dialling, call routing, home appliance control, in-vehicle applications, search, data entry, preparation of structured documents, and speech-to-text processing (e.g., word processors or emails).

With new laws banning driving and handling of electronic devices, using voice activated dialling (e.g. over a Bluetooth™ headset) has become more common. End-user experience is shaped by the ability of the voice recognition engine to accurately resolve the commands and the contact referenced. A major challenge of voice recognition engines is dealing with phonetic variations associated with names input in different origin languages and end-user accents. The detection accuracy problem is further amplified when the audio path is extended, for example going through the Bluetooth™ headset microphone instead of the resident microphone of the handheld phone.

Some conventional voice recognition engines are trained merely by having the user read a known paragraph at setup time.

Additional difficulties with some existing systems may be appreciated in view of the detailed description below.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION OF EXAMPLE EMBODIMENTS

Figure 1:
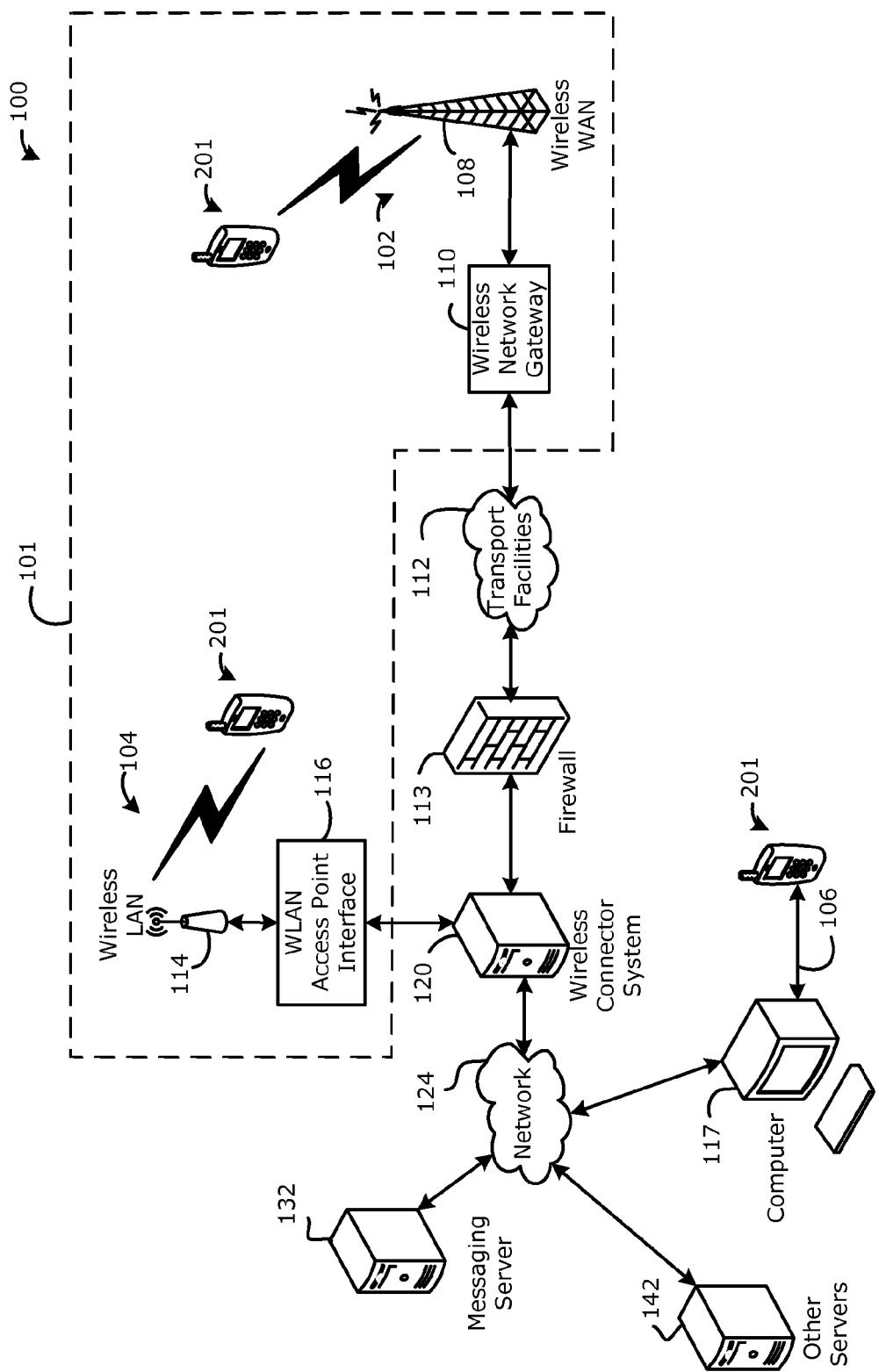
FIG. 1 illustrates a block diagram of a communications system to which embodiments may be applied.

Some conventional voice recognition engines give the user the option to record a voice tag when adding a new contact. For example, the end-user is prompted to record a voice tag for that specific contact. Subsequent voice dialling attempts compare a voice input request to the voice tags on record. This process may be cumbersome for some users since it increases the number of steps involved in creating a contact. Also, this voice tag does not simulate how the voice input would be used in actual operation conditions of the device, for example when used in a vehicle, car, airplane, or factory setting.

In some example embodiments, there is provided a method for automatically identifying voice tags through user operation of an electronic device, the electronic device having access to data records such as contact records. For example, after failure to initiate a communication using a voice input command, the user may then subsequently contact the recipient using an application program of the electronic device. The original audio of the voice input command may be automatically identified as a potential voice tag for the now-identified recipient. The voice tag can then be saved to the device, if desired.

In accordance with an example embodiment, there is provided a method for automatically identifying voice tags on an electronic device configured to execute at least a voice interface program and an application program, the method including: receiving, through the voice interface program, a voice input command, the voice input command including a command element and a content element; ending the voice interface program without performing the voice input command; receiving, through the application program, a user input which identifies data for executing an application program command; performing the application program command; and identifying audio of the content element as a voice tag associated with the data identified by the user input.

In accordance with an example embodiment, there is provided an electronic device, which includes: a processor configured to execute at least a voice interface program and an application program; memory coupled to the processor; an input interface including an audio input interface; and an output interface. The processor is further configured to: receive, through the voice interface program, a voice input command, the voice input command including a command element and a content element, end the voice interface program without performing the voice input command, receive, through the application program, a user input which identifies data for executing an application program command, perform the application program command, and identify audio of the content element as a voice tag associated with the data identified by the user input.

In accordance with an example embodiment, there is provided a non-transitory computer readable medium having instructions stored thereon which, when executed by a processor on an electronic device configured to execute at least a voice interface program and an application program, causes the electronic device to: receive, through the voice interface program, a voice input command, the voice input command including a command element and a content element; end the voice interface program without performing the voice input command; receive, through the application program, a user input which identifies data for executing an application program command; perform the application program command; and identify audio of the content element as a voice tag associated with the data identified by the user input.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) and optionally other servers 142. The other servers 142 may comprise a content server for providing content such as internet content or content from an organization's internal servers to the mobile communication devices 201 in the wireless network 101, an application server for implementing server-based applications such as instant messaging (IM) applications, or a web server for providing content accessible by a web browser.

For the purposes of the described example embodiments, any server within an enterprise network, such as a messaging server or any other server, will be referred to as an enterprise server. A service may include one or more servers or enterprise servers.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

Encryption keys used for communications or for encrypting data stored on the device can be protected via various means such as a password or hardware-based protections, such as those afforded by hardware-based key stored mechanisms.

The wireless network gateway 110 is adapted to send data packets received from the mobile device 201 over the WWAN 102 to the wireless connector system 120. The wireless connector system 120 then sends the data packets to the appropriate connection point such as the messaging server 132, or other servers 142. Conversely, the wireless connector system 120 sends data packets received, for example, from the messaging server 132, or other servers 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, or other servers 142.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth® special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the example embodiments.

Figure 2:
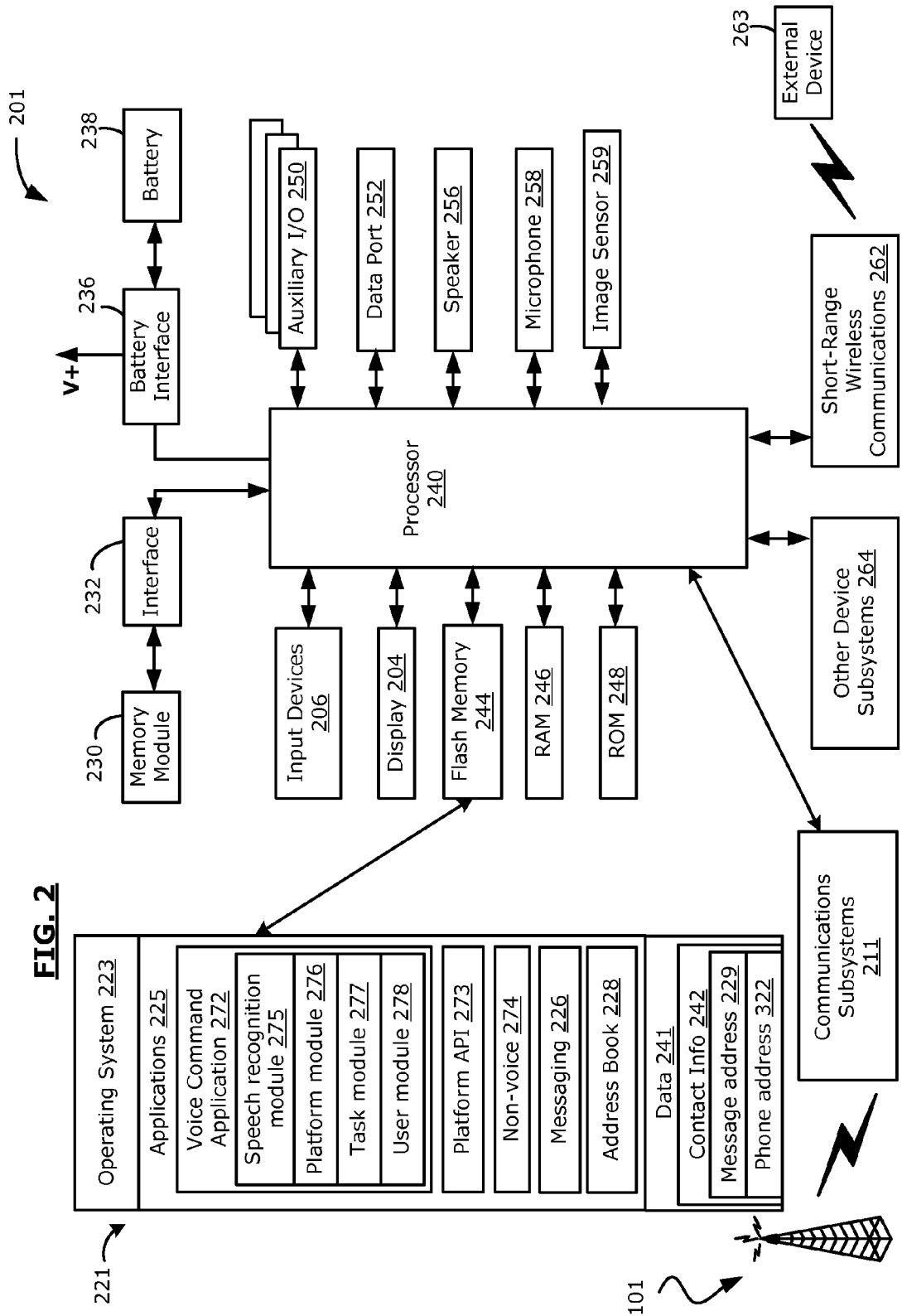
FIG. 2 illustrates a block diagram showing an example embodiment of a mobile device that can be used in the communications system of FIG. 1.

Reference is first made to FIG. 2 which shows in block diagram form a mobile device 201 in which example embodiments can be applied. The mobile device 201 is a two-way communication device having data and voice communication capabilities, and the capability to communicate with other computer systems, for example, via the Internet. Depending on the functionality provided by the mobile device 201, in various embodiments the mobile device 201 may be a smartphone, a mobile telephone or a PDA (personal digital assistant) or tablet enabled for wireless communication, or a computer system with a wireless modem, such as a computer system within a vehicle.

The mobile device 201 includes a case (not shown) housing the components of the device 201. The internal components of the mobile device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port speaker 256, microphone 258.

The mobile device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The mobile device 201 may communicate with any one of a plurality of fixed transceiver base stations 108 (FIG. 1) of the wireless network 101 within its geographic coverage area. The mobile device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223, data 241, and software applications 225, which for example, may include a platform API 273, one or more non-voice applications 274 and a voice command application 272. The voice command application 272 may include speech recognition module 275, a platform module 276, a task module 277, and a user module 278. The software applications 225 may further include a web browser (not shown), a file manager application (not shown), one or more messaging applications 226 such as a text or instant messaging application, and an email messaging application, and an address book application 228. Such applications 225 may or may not already be voice-enabled. In some example embodiments, the functions performed by each of the applications may each be realized as a plurality of independent elements, and any one or more of these elements may be implemented as parts of other software applications 225. The data 241 may include at least messaging address information 229 and telephone address information 322. In some example embodiments, one or more applications 225 are configured to receive data, such as files, documents or other information, from a server, such as a messaging server 132 (FIG. 1), or another server 142 (FIG. 1). Non-limiting examples of data received from a server may include email attachments, files transferred via file transfer protocol (FTP) or any other protocol, documents or files downloaded from a web page via a web browser, or files sent via a text or instant messaging application.

In some examples, the software applications 225 may be implemented using a number of services which define the communication protocols used to communicate between an external server 142 and an application on the communication device. Some applications may only connect to a single type of server using the same communication protocol settings and will therefore only operate using a single service, while other applications may connect to a variety of servers using different communication protocols and will require multiple services. For example, a banking application on a communication device may only require a single service defining the communication protocol for securely communicating with the bank's online banking server, while a web browser may require many different services such as services for general web page browsing, for secure web page browsing, for streaming video, for accessing corporate web email, for accessing social media applications or websites, or for accessing online public email services.

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 includes a removable memory card 230 (typically comprising flash memory) and a memory card interface 232. The mobile device 201 can store data on the removable memory card 230, in an erasable persistent memory, which in one example embodiment is the flash memory 244, or on both a removable memory card and in an erasable persistent memory.

In some embodiments, the mobile device 201 is provided with a service routing application programming interface (API) which provides an application with the ability to route traffic through a serial data (i.e., USB) or Bluetooth® connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices. In another example, the short-range communication subsystem 262 may communicate with an external device 263 having a microphone and/or a speaker (not shown), to aid in the hands-free operation of the mobile device 201.

The mobile device 201 also may include image sensor 259 configured to generate digital image data. The image sensor 259 may include a conventional optical sensor for capturing digitized image data, or may be some other digital imaging device. The image sensor 259 operates by capturing visual data from the environment using photosensitive electronic elements and transmitting or storing this data as digital image data using other components of the mobile device 201. The image sensor 259 may be, for example, a camera or a charge-coupled device (CCD).

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information. Similarly, audio signal input and audio signal output may be accomplished through an audio input interface and an audio output interface, respectively. The audio input interface may be the microphone 258, but may also be the short-range communication subsystem 262 which may receive an audio input from the external device 263. Similarly, the audio output interface may be the speaker 256, but may also be the short-range communication subsystem 262 which may communicate an audio output to the external device 263.

Referring again to FIG. 2, the software applications 225 of the mobile device 201 can include a platform API 273 of a platform class that is configured to permit applications, such as voice-enabled applications, to register with the platform API 273. As well, the platform API 273 is configured to receive events and pertinent information from non-voice applications 274 which becomes voice-enabled through operation the voice command application 272. These may include applications that are native or resident on the mobile device 201, and also may include applications developed by third party developers or external applications. Third party applications may include applications downloaded to the mobile device 201 through an external network. The platform API 273 is further configured to permit communication between the registered voice-enabled applications, including the voice command application 272, and the non-voice applications 274.

The voice command application 272 configures the processor to implement a speech recognition module 275, a platform module 276, a task module 277 and a user module 278. The speech recognition module 275 is configured to receive audio data gathered by the microphone 258 and, where this audio data comprises a voice input, the module may translate the voice input into text corresponding to the content of the voice input. The speech recognition module 275 may perform this translation according to any of a number of conventional speech recognition algorithms. The platform module 276 is configured to initiate the registration of the voice command application 272 with the platform API 273, enabling the voice command application 272 to receive information from the platform class regarding both voice-enabled applications and non-voice applications 274. The user module 278 is configured to produce a voice prompt to the user and to issue the voice prompt to the user via the speaker 256. Collectively, the user module 278 and the speech recognition module 275 can implement voice interface programs or voice interface sessions with the user, through back-and-forth communications with the user.

The platform module 276 of the voice command application 272 is configured to register the voice command application 272 with the platform API 273. Consequently, the voice command application 272 is identified as a registered "listener" of the platform API 273, and this enables the voice command application 272 to receive from the platform API 273 events and additional information regarding voice-enabled applications and the non-voice application 274.

The speech recognition module 275 of the voice command application 272 recognizes a voice input and receives a voice input via the microphone 258 of the mobile device 201. The activation of the voice command application 272 triggers the microphone 258 to be activated and monitoring for a voice input from a user. As well, the microphone 258 may be activated by other triggers to monitor for a voice input.

The speech recognition module 275 of the voice command application 272 extracts from the voice input one or more elements. The speech recognition module 275 parses the voice input into one or more discrete elements that may define a voice command or a particular input for one of the user interface objects. The speech recognition module 275 may further translate the voice input received by the microphone 258 into text or another form intelligible to the mobile device 201, according to any of a number of conventional speech recognition algorithms as understood in the art.

Referring again to FIG. 2, the address book application 228 provides a user interface for managing contact information 242. The address book application 228 is configured to allow users to view, add, delete, and/or modify contact information 242 associated with one or more contacts. The address book application 228 and the email messaging application 226 may, in various embodiments, be: integrated with and/or provided by the operating system 223; stand-alone applications 225; or integrated into a single messaging application which provides the functionality of both the messaging application 226 and the address book application 228.

The mobile communication device 201 stores data 241 in an erasable persistent memory, which in one example embodiment is the flash memory 244. The data 241 includes service data and user application data. The service data comprises information required by the mobile communication device 201 to establish and maintain communication with the wireless network 101. The user application data may include such as email messages (not shown), calendar and schedule information (not shown), notepad documents (not shown) and image files (not shown).

The user application data stored in the memory 244 also includes the contact information 242 associated with a plurality of contacts. The contact information 242 may be for individuals and/or businesses, such as persons or businesses associated with one or more users of the mobile communication device 201. The contacts may also be categorized according to these individual and businesses categories. Individuals or businesses may also be saved as part of a group. The contact information 242 includes one or more contact addresses comprising messaging addresses 229. Each messaging address 229 specifies an address, such as an email address or a telephone number, which may be used by the contact for receiving electronic messages. The contact information 242 may be stored in a contact information database (sometimes referred to as an address book database or merely address book, contact list or contacts). Each contact in the contact information 242 may have a contact record in the contact information database which is accessible by the address book application 228. In some embodiments, the contact information 242 may be stored in a remote contact information database in addition to, or instead of, the memory 244. The remote contact information database is typically stored and managed by the messaging server 132, but could be stored and managed by another network component such as the wireless connector system 120. Some or all of the contact information 242 particular to the user could be synchronized between the local and remote contact information databases, depending on the embodiment. In addition, the user application data including contact information 242 may be synchronized with a user's host computer 117 in whole or in part in some embodiments.

It will be appreciated that, in some embodiments, the contact information 242 may include various categories or types of messaging addresses 229. For example, the messaging address 229 may be categorized as an email address, a telephone number associated with SMS messaging, an instant messaging address, or a unique identifier such as a personal identification number (PIN) which is associated with a specific mobile communication device 201 or user.

A messaging address 229 is an address for use in sending an electronic message of a given type. The messaging addresses 229 could be, but not limited to, a mobile telephone number for a mobile telephone capable of receiving SMS and/or MMS messages, an email address, an instant messaging (IM) identifier or address for an IM network, a user or device identifier such as a PIN for sending device-to-device messages (also referred to as peer-to-peer messages or PIN messages), an identifier within a private or proprietary communication system or network such as Facebook™, MySpace™ or Blackberry Groups™, or a SIP URI (session initiation protocol uniform resource identifier) for a Voice over Internet Protocol (VoIP) network. Contact identifiers could include predetermined types of identifying information which are not messaging addresses 229 including, but not limited to, identifying information for a Blog, Really Simple Syndication (RSS) feed identifying information, or a landline telephone number for a telephone on a public switched telephone network (PSTN).

Figure 3:
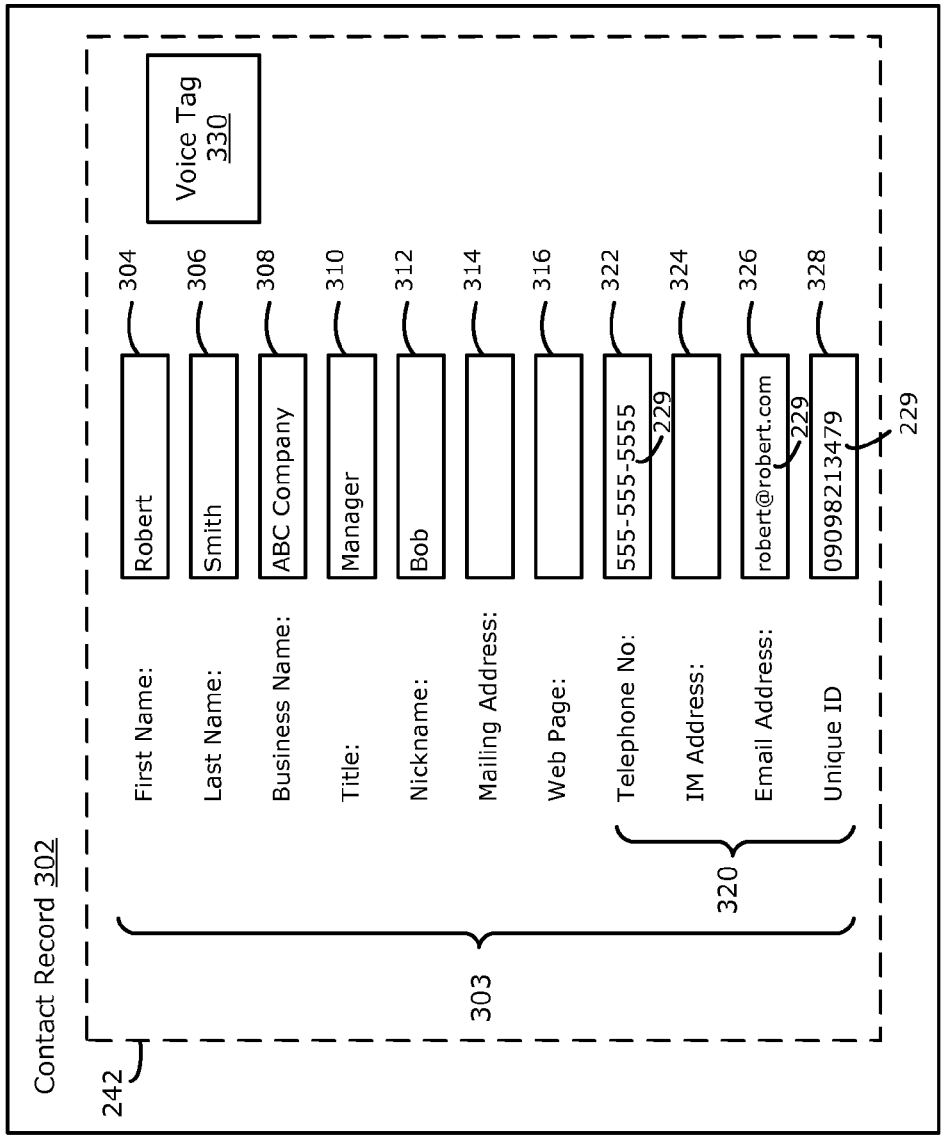
FIG. 3 illustrates a block diagram showing an example contact record with which example embodiments can be applied.

Referring now to FIG. 3, an example contact record 302 with which example embodiments can be applied will now be described. The contact record 302 shown in FIG. 3 illustrates the data structure of a contact record 302 rather than a user interface representation of the contact record 302. The GUI of a mobile communication device 201 may display a contact record 302 differently from that shown in FIG. 3, and may display more or less than the illustrated fields.

The contact record 302 includes a plurality of fields 303, including a first name field 304 which may be used for storing a contact's given name; a last name field 306 which may be used for storing a contact's surname; a business name field 308, which may be used to store the name of a company associated with the contact; a title field 310, which may be used to store the contact's job title; a nickname field 312, which may be used to store a nickname for the contact, such as an abbreviated form of the contact's given name; a mailing address field 314, which may be used to store a postal address associated with the contact; a web page field 316, which may be used to store the address of a web page associated with the contact; and a telephone number field 322, which may be used to store a telephone number. Additional telephone number fields 322 may be provided, for example one or more for work, home, mobile, session initiation protocol (SIP) address, etc. One of the telephone number fields 322 may be indicated as a default telephone number to be called for each particular contact record 302.

The contact record 302 also includes one or more messaging address fields 320 which may be used to store one or more messaging addresses 229 which may be used to send an electronic message to the contact. For example, the messaging address field 320 may include one or more of the telephone number field 322, wherein the telephone number is associated with the contact and through which the contact may receive an SMS text message or MMS message; an instant messaging field 324, which may be used to store an instant messaging address associated with the contact; an email address field 326 which may be used to store an email address associated with the contact; and/or a unique identifier field 328 which may be used to store a unique identifier for sending device-to-device messages (also referred to as peer-to-peer messages or PIN messages). The unique identifier is different from the telephone number of the mobile communication device 201 and typically has a proprietary addressing format which may vary depending on the embodiment. One of the messaging addresses 229 may be indicated as a default messaging address for each particular contact record 302.

As will be appreciated to persons skilled in the art, device-to-device messages require software support on the mobile communication device 201. Accordingly, not all mobile communication devices 201 have the software required for message addressing using non-telephonic unique identifiers. Thus, it is possible that at least some of a user's contacts do not have a unique identifier. In such cases, device-to-device messages cannot be sent to such contacts and the unique identifier field 328 of the corresponding contact record 302 will be empty and possibly hidden depending on the GUI settings of the device 201.

The unique identifier stored in the unique identifier field 328 uniquely identifies a mobile communication device 201. The unique identifier may be, but is not limited to, a personal identification number (PIN) which is associated with a communication device associated with a contact, the contact, or both. The PIN may be numeric or alphanumeric. In some embodiments, the PIN is assigned to the contact's mobile communication device during its manufacturing. The PIN functions as an address for communicating with the contact's mobile communication device. That is, messages sent to a PIN will be received at the contact's mobile communication device associated with that PIN. The PINs of the mobile communication devices 201 are not published as may occur with telephone numbers. Typically, a PIN must be shared between users. Accordingly, contacts having a mobile communication device 201 which supports PIN addressing but have not shared their PINS will have a corresponding contact record 302 with an empty unique identifier field 328 which may be hidden depending on the GUI settings of the device 201.

Device-to-device messages are sent using a carrier's wireless network infrastructure without interacting with the wireless connector system 120 as with email messages and other electronic messages. Depending on the architecture, if the carrier's wireless network infrastructure does not support PIN addressing a third party relay service which supports PIN addressing may be required. The relay service provides routing services and stores routing information required to route device-to-device messages from a sending device to one or more receiving device(s) using the carrier's wireless network infrastructure. The routing information comprises address mappings of device PINs (or other unique identifiers) to another form of device address supported by the carrier's wireless network infrastructure including, but not limited to, IP addresses of the mobile communication devices.

As will be appreciated by persons skilled in the art, device-to-device messages and unique identifiers associated with recipient electronic devices used for addressing PIN messages are typically stored on the mobile communication device 201 in the personal address book database and not stored in the global address book database of the wireless connector system 120 or synchronized with a user's host computer 117. Accordingly, PIN-based filtering is typically only possible on a supported mobile communication device 201. In some embodiments, PINs may be stored by the messaging server 132 for the supported mobile communication devices 201 but not stored in the global address book database of the wireless connector system 120 or synchronized with a user's host computer 117. However, it is possible that in other embodiments PINs are stored in the global address book database of the wireless connector system 120 and synchronized with a user's host computer 117.

It will be appreciated that the contact record 302 may include more or less information than that described above with reference to FIG. 3. In some cases, some types of the contact information 242 specified above may contain multiple entries. For example, a contact may have more than one email address. It will also be appreciated that, each field of the contact record 302 may not be populated for all contacts. That is, some of the fields in the contact record 302 may be left intentionally blank for some contacts. For example, in the example contact record 302 illustrated in FIG. 3, the mailing address field 314, the web page field 316 and instant messaging address field 324 have not been populated.

The contact records 302 in the contact information database may be indexed using one or more of the fields 303 of the contact record 302. For example, in some embodiments, the contact records 302 are indexed based on the contents of the first name field 304. In other embodiments, the contact records 302 are indexed based on the last name field 306.

Referring still to FIG. 3, in some example embodiments, a particular contact record 302 can be associated with a voice tag 330. The voice tag 330 is a stored audio recording of the user which is associated with the particular contact record. When a given voice request is made by the user, that voice request can be compared to the voice tag 330 to determine that the particular contact record 302 is correctly identified, rather than comparing the voice request to text using the speech recognition module 275. In some example embodiments, the voice tag 330 is a spoken full contact name or part contact name of the contact name. For example the part contact name can include some or all of the first name 302, last name 306, business name 308, or nickname 312, etc. For example, referring to the example contact record 302 of FIG. 3, exemplary voice tags 330 include "Bob", "Robert", "Mr. Smith", "Manager of ABC", etc. The user may also wish to use a short form name to contact his own home or work, using voice tags such as "home" or "work", for the user's home or work contact address, respectively. Such voice tags 330 can be contrasted with some conventional systems which require the user to read a particular specified passage or paragraph, since the voice tags 330 store audio of the exact intonation, accent, and words as spoken by the user. In some example embodiments, an association can be stored with the voice tag 330 indicating a known text equivalent, such as all or part of the name fields 304, 306, 308, 310, 312. In some example embodiments, the voice tag is any voice input which is desired to be associated with the contact record 302.

In some example embodiments, the voice tag comprises the name as well as an associated command, e.g. the voice tag is "call Bob" rather than just "Bob" in association with Bob's telephone address information 322. This requires additional storage but provides greater accuracy for matching with the exact phrase.

A user can manually input a voice tag 330 when initially creating or editing a particular contact record 302. Further, for example from the address book application 228, the user can play or output any existing voice tag 330 for verification. Further, in example embodiments described herein, the voice command application 272 can be further configured to dynamically and automatically generate the voice tag 330 based upon particular user operation of the device 201.

Figure 4:
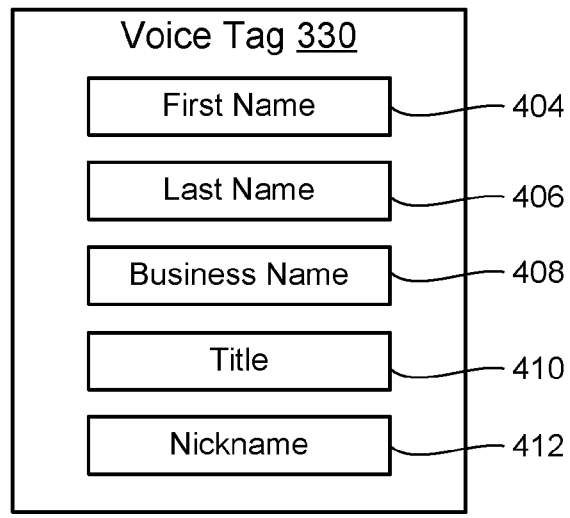
FIG. 4 illustrates an example voice tag, in accordance with an example embodiment.
Figure 5:
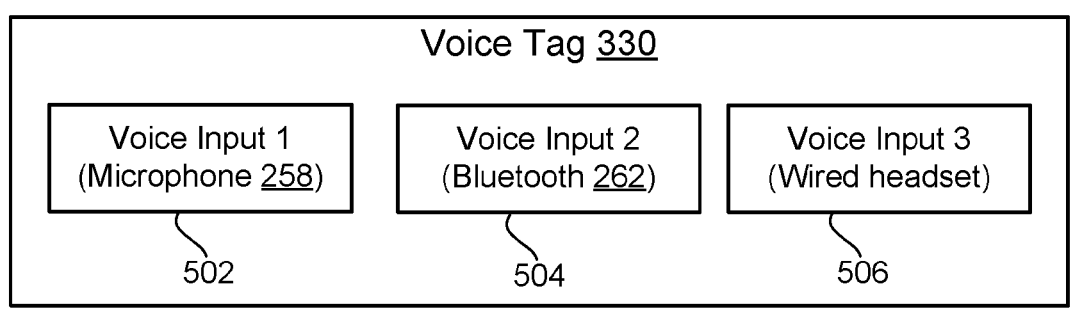
FIG. 5 illustrates another example voice tag, in accordance with another example embodiment.

Referring still to FIG. 3, for example, the voice tag 330 can be a single voice tag 330 associated with the contact record 302. Reference is now made to FIGS. 4 and 5, which illustrate additional example embodiments wherein the voice tag 330 can include multiple voice tags. For example, with reference to FIG. 3, in some example embodiments some or all of the name fields 304, 306, 308, 310, 312 (FIG. 3) can each have a respective stored voice tag 330. As shown in FIG. 4, the voice tag 330 can include a respective tag for at least one or all of the first name 404, last name 406, business name 408, title 410, and nickname 412. In some example embodiments, only one of the voice tags 404, 406, 408, 410, 412 is used for comparison. In other example embodiments, if a voice request indicates the first name and last name of the desired user, each of the voice tags for first name 404 and last name 406 can be compared to the voice request. Other combinations and subcombinations can be implemented, in example embodiments.

Reference is now made to FIG. 5, which illustrates another alternate example embodiment of the voice tag 330. For example, another difficulty with accurately identifying the user's voice input is when the audio path is extended (e.g. going through a Bluetooth headset microphone or wired headset microphone instead of a resident handheld microphone). To account for any variations (including any digital processing or compression) of the particular voice input peripheral device, a voice tag per voice input peripheral device (audio path) may be stored. As shown in FIG. 5, the voice tag 330 may include a voice tag for each input device for some or all of the contact records 302, shown as voice input 1 (502) for the resident microphone 258, voice input 2 (504) for the microphone of a Bluetooth headset 262, and voice input 3 (506) for the microphone of a wired headset. The voice tag 330 of FIG. 5 illustrates a single respective voice tag for each input device, while in other example embodiments, not shown, a voice tag may be stored for each of the name fields 304, 306, 308, 310, 312 (FIG. 3). The device 201 can first detect the type of input device being used to input the voice command, followed by comparing with those voice tags 502, 504, 506 which are associated with that particular input device, if available.

Example methods in accordance with some example embodiments will now be described, with reference to FIGS. 6 and 7. Generally, in example embodiments, there is provided a method for automatically generating voice tags through user operation of the mobile device 201. For ease of illustration, the described methods in accordance with some example embodiments will presume that only a single voice tag is associated with each contact record 302, with the understanding that multiple voice tags may be used for a contact record 302 in some example embodiments where indicated. For ease of illustration, the particular contact address which is to be contacted by the device 201 (e.g. telephone number or messaging address) can be a default contact address, or may be further identified by the user through voice input, e.g. "home", "office", "e-mail", etc.

Figure 6:
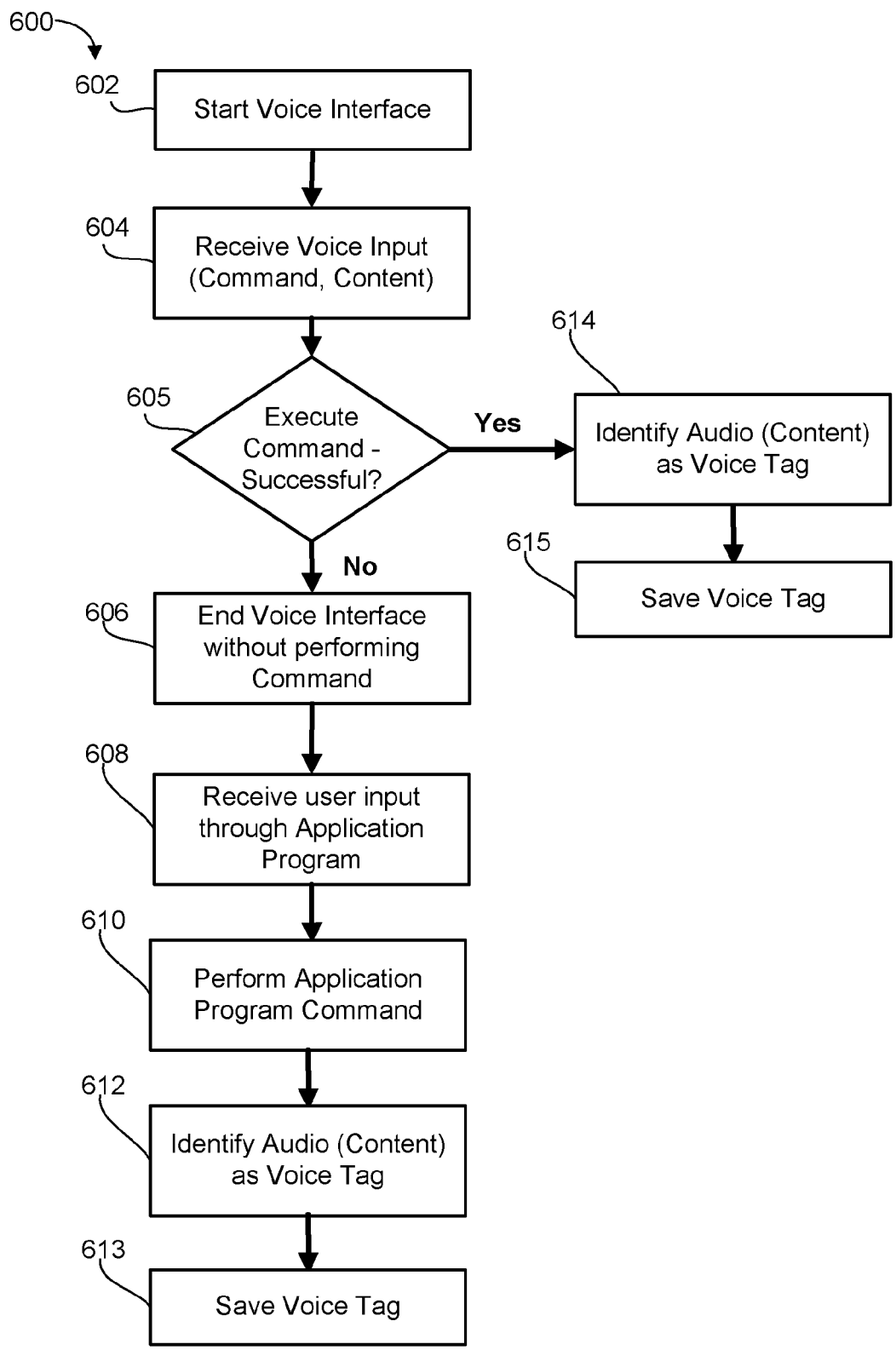
FIG. 6 shows, in flowchart form, an example method for automatically identifying a voice tag, in accordance with an example embodiment.

Reference is now made to FIG. 6, which shows a method 600 for automatically identifying voice tags from the voice command application 272, in accordance with an example embodiment. At event 602, a voice application user interface (voice interface) program or session is started, for example by launching the voice command application 272 (FIG. 2). At event 604, the voice command application 272 of the mobile device 201 receives through the audio input interface a voice input command, which may include at least a command element and a content element. In some example embodiments, the voice input command is for initiating a communication to a desired recipient. The command element may indicate a desired type of communication to be initiated, such as a "call" for telephone call, "message" for an electronic message, "e-mail" for an electronic mail message, or "SMS" for a short-message-service message, etc. Other commands are also possible in some example embodiments. The content element may be a name, or part of a name, which is intended to identify a particular contact record 302. Other types of content or data records are also possible in some example embodiments. For example, the voice input command may further include additional message recipients (e.g. additional direct recipient, carbon copy or blind carbon copy), a message body, a subject header, or other parts of a message, for populating a message being sent. Typically, the command elements are limited to short predetermined phrases which are easier to disambiguate than the content elements. For the purposes of some example embodiments, it may be presumed that the command element has been correctly identified from the voice input command.

At event 605, the voice command application 272 attempts to execute the desired operation of the received voice input command, for example by identifying an appropriate application program associated with the command element, and using or populating the application program with the content element. Upon successful execution of the voice input command, e.g. successfully initiating the communication, a new potential voice tag is identified generated at event 614. In other words, the speech recognition module 275 has correctly disambiguated or matched the content element to the correct contact record 302. For example, at event 615, the original received audio of the content element of the voice input command at event 604 can now be saved in memory as the voice tag for the now identified contact record 302. At event 606, if the voice command application 272 fails at event 605, the voice interface program of the voice command application 272 therefore ends without performing the requested command element. For example, this may be because the content element could not be used to properly identify the desired contact record 302, or the variances in user's intonation, accent, and/or words could not be correctly resolved, or because the user manually ends the voice interface program or session due to improper identification of the contact record 302, or e.g., ended out of general user frustration after multiple back-and-forth communications with the voice interface program.

The user may then attempt to perform the same desired function using another application program. At event 608, through a user interface of an application program, a user input command containing input content is received to execute an application program command. The input content can be, for example, used to identify the desired data such as the contact record 302. For example, the user has decided to no longer use the voice command application 272, for example due the failure of the voice command application 272 to properly identify the correct contact record 302, and the user may then decide to subsequently dial the desired contact directly (e.g. keyboard typing into the contact name or by scrolling to the desired contact through the address book application). The user input command can therefore comprises one or more separate user inputs, for example the selection or typing in of the desired contact, followed by the command for initiation of the communication, such as selecting "send" to initiate a telephone or message communication. At event 610, based on the user input command, the application program command can be executed by the particular application program of the device 201. The method 600 may end at this stage if the application program fails, e.g., the user prematurely ends the execution of the application program. At event 612, upon successful execution of the application program command, a new voice tag can be identified. For example, the original received audio of the content element of the failed voice input command at event 604 is identified as a potential voice tag for the now identified data (e.g. contact record 302). After identification at event 612, the option to create a voice tag can be presented to the user for confirmation. Upon user confirmation, at event 613, the voice tag is saved in memory for the identified data (contact record 302). In some example embodiments, if the application program command is not successfully executed (e.g. manually terminated, no associated contact record 302, or otherwise fails), then no voice tag is generated.

Referring again to event 602, with reference to FIG. 2, in order to start the voice interface program, in some example embodiments the activation of the voice command application 272 triggers the microphone 258 to be activated and monitoring for a voice input from a user. As well, the microphone 258 may be activated by other triggers to monitor for a voice input. Other embodiments include specified audio trigger words to turn on the voice interface program.

In FIG. 6, referring again to event 604, in some example embodiments, the particular audio input interface or audio input device can be determined. If available, referring to FIG. 5, the respective voice tag 330 can be searched based on the type of input device used to enter the particular voice input command. The respective voice tag can be voice input 1 (502) for the resident microphone 258, voice input 2 (504) for the microphone of a Bluetooth headset 262, and voice input 3 (506) for the microphone of a wired headset.

Referring to event 605, in order to attempt to perform the command element, this may include attempting to match the received content element with an existing contact record 302, which may include searching text of the contact records 302 or matching with previously stored voice tags, if available.

Events 605 and 606 will now be described in greater detail, in accordance with some example embodiments. In one aspect, the voice command application 272 may find a best match from the content element of the voice input command and start executing the command (e.g. dialling the closest found contact record 302). If the match is correct, then the end-user will allow the call to proceed and the audio of the content element can be recorded as the voice tag for this contact record 302 for future dialling attempts. If the match is not correct, then the end-user is likely to terminate the call and, either: try again to use the voice command application again at which point the method 600 starts again at event 602; or, the method 600 proceeds to event 608 wherein the user dials the desired contact directly, such as typing in the phone number digits or searching for the contact through the address book application 228 (e.g. typing in the contact name or navigating to the desired contact record).

Referring still to events 605 and 606, in another aspect, the voice command application 272 may find multiple suggestions from the content element of the voice input command and present those to the user in a contact selection user interface. If one of those contacts is selected by the end-user, the audio of the content element can be recorded as the voice tag for this contact record 302 for future dialling attempts. If none of the suggested contacts are selected by the end user through the contact selection user interface, then the method 600 proceeds to event 608.

Referring still to events 605 and 606, in another aspect, the voice command application 272 may not be able to find any suggested contacts based on the content element of the voice input command. If this is the case, then the end-user is likely to terminate the call and, either: try again to use the voice command application again at which point the method 600 starts again at event 602; or, the method 600 proceeds to event 608 wherein the user dials the desired contact directly, such as typing in the phone number digits or through the address book application 228.

In some example embodiments, the receiving of the user input command through the application program at event 608 is the immediately next user input command which is entered after the ending of the voice interface program at event 606. Event 608 may be the next user input command which is received within a specified time period, for example within five seconds of the ending of the voice interface program at event 606.

Referring again to event 608, in some example embodiments the application program which receives the user input command is a non-voice interface application, such as graphical user interface or visual user interface based application. Some example application programs are telephone applications and messaging applications. Such user input can be received through at least one of a keyboard, mouse, trackball, scrollball, scrollwheel, touch screen, touch pad, and light pen. Therefore, the user may be operating the application program of the mobile device 201 using hand operations in the normal course of operation, as a subsequent alternate operation to a failed voice input attempt. For example, it would be appreciated that in example embodiments there would be no initial prompting (audio or otherwise) for specifically requesting user input to create a voice tag. Rather, operation is performed by the user through the application program during normal operation to actually perform commands from the application program. It would also be appreciated that the identified voice tag reflects how the user would enter the voice input command in actual operating conditions, for example when operating the mobile device 201 in a car, airplane, or factor setting.

In some example embodiments, referring to events 612 and/or 614, after a potential voice tag is identified based on the user operation, a user prompt may be output to the user to request final confirmation of whether the voice tag is to be stored in memory. In some example embodiments, if a voice tag already exists for the contact record 302, the user prompt may default to not overwrite the existing voice tag, or in other example embodiments further advise the user that generation of the voice tag would overwrite the existing voice tag. In some example embodiments, the voice tag is automatically generated and saved as a background function, based on predetermined settings and defaults, without any further user prompting.

The next time the user attempts to contact the desired recipient using the voice interface program, the user can provide a voice input command. The voice input command can be compared to the voice tag that was generated using the method 600, to determine a suitable match.

In some example embodiments, the voice tag is identified and stored as the entire original audio voice input command, including the content element and the command element. For example, the identified voice tag is "call Bob" rather than just "Bob", in association with Bob's telephone address information 322. This requires additional storage capacity but provides greater accuracy for matching with the exact phrase.

Figure 7:
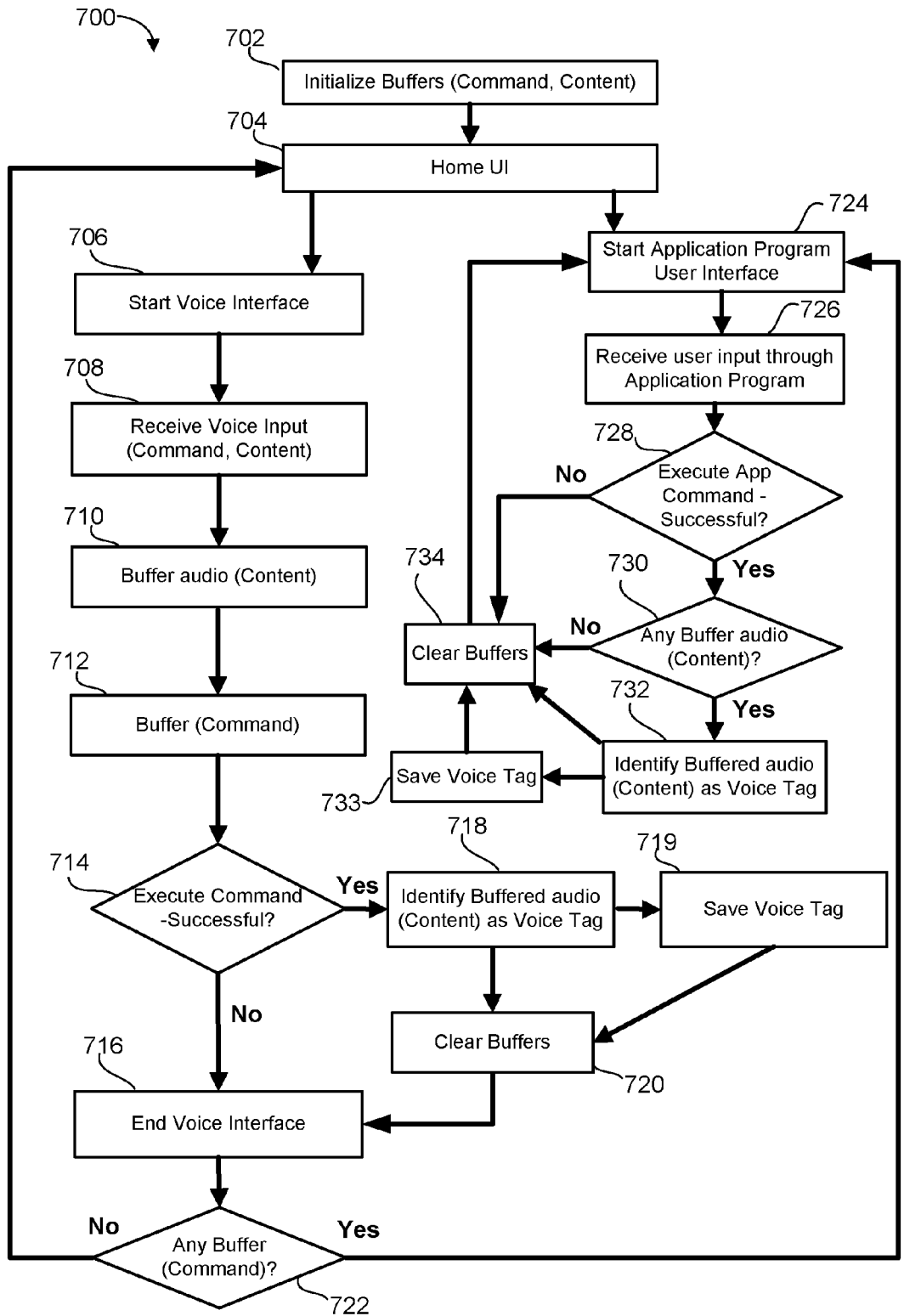
FIG. 7 shows, in flowchart form, another example method for automatically identifying a voice tag, in accordance with another example embodiment.

Reference is now made to FIG. 7, which shows another method 700 for automatically identifying voice tags from the mobile device 201, in accordance with another example embodiment. At event 702, the voice command application 272 can initialize a respective memory buffer which can temporarily store a command element and a content element. In example embodiments, the command element is stored as text or other indicator. In example embodiments, the content element is stored as audio from a voice input. In example embodiments, only one command element and one content element can be stored in the respective buffer at a time. Initializing the buffers also includes clearing or voiding the buffers if there is content previously contained thereon.

At event 704, the mobile device 201 first executes a home user interface mode, for example from the operating system 223. This can include, for example, a home interface screen wherein the user can launch or open any number of applications 225, configure preferences and settings, etc. The home interface screen can be displayed as a visual user interface on the display 204. In some example embodiments, the home user interface mode may include a voice interface mode, wherein voice input commands can be entered, or applications (including voice-enabled applications) can be launched using voice commands.

At event 706, a voice application user interface (voice interface) program or session is started, for example by launching the voice command application 272 (FIG. 2). At event 708, the voice command application 272 of the mobile device 201 receives through the audio input interface a voice input command, which may include at least a command element and a content element. The command element may indicate a desired type of communication to be initiated, such as a "call" for telephone call, "message" for an electronic message, "e-mail" for an electronic mail message, or "SMS" for a short-message-service message, etc. Other commands are also possible in some example embodiments. The content element may be a name, or part of a name, which is intended to identify a particular contact record 302. Other types of content are also possible in some example embodiments. Typically, the command elements are limited to short predetermined phrases which are easier to disambiguate than the content elements. For the purposes of some example embodiments, it is presumed that the command element has been correctly identified from the voice input command.

At event 710, the audio of the content element is stored to the buffer. At event 712, the command element is stored to the buffer (typically as text or some other indicator, rather than audio).

At event 714, the voice command application 272 attempts to execute the desired operation of the received voice input command, for example by identifying the appropriate application associated with the command element, and using or populating the application with the content element. Upon successful execution of the command element, a new voice tag can be identified at event 718. In other words, the speech recognition module 275 has correctly disambiguated or matched the content element to the correct contact record 302. For example, the buffered audio of the content element at event 710 is identified, and a final user confirmation may be presented to the user. At event 719, the voice tag can now be saved in memory as the voice tag for the now identified contact record 302. At event 720, having generated and stored the voice tag, the buffers are cleared.

At event 716, if the voice command application 272 fails at event 714, the voice interface program of the voice command application 272 therefore ends without performing the requested command element. For example, this may be because the content element could not be used to properly identify the desired contact record 302, or the variances in user's intonation, accent, and/or words could not be correctly resolved, or because the user manually ends the voice interface program or session due to improper identification of the contact record 302, or e.g., out of general frustration.

At event 722, if there is no command element stored in the memory buffer, the method 700 returns to the home user interface at event 704. Referring still to event 704, for example when the voice interface program has failed or could not execute the desired voice input command, a user may then proceed to open or launch an application program at event 724. Typically, this can be the next function that is operated after failure of the voice interface application. For example, the user may wish to manually find the desired contact using the application program.

As an initial check, in some example embodiments (not shown), it can be determined that the command element which was buffered at event 712 is associated with the particular application program that was launched. For example, if the original command element was for telephoning, and the application program was the user playing a video game, then no voice tag would be stored based on the user input. If the application program is not associated with the command element buffered at event 712, then the buffers are cleared and the method 700 returns to the home user interface at event 704. On the other hand, if the original command element was for telephoning, and the potential voice tag was generated through operation of a phone application, then the method 700 continues to event 724.

In some example embodiments, referring to event 722, if a buffer memory contains the command element, the method 700 may proceed directly to event 724 to open an application program associated with the command element. For example, if the command element is a phone or a message function, the application program being automatically started may be an address book application 228, messaging application 226, or phone application, as appropriate.

At event 726, through a user interface of the application program, a user input command containing input content is received to execute an application program command. The input content can be used to identify the desired contact record 302. For example, the user has decided to no longer use the voice command application 272, for example due the failure of the voice command application 272 to properly identify the correct contact record 302, and the user may then decide to subsequently dial the desired contact directly (e.g. using the keyboard or other user input device). At event 728, based on the user input command, the application program command can be executed by particular application program of the device 201. The user input command therefore identifies the desired contact record 302. At event 728, upon successful execution of the application program command, a new voice tag can be identified and saved. At event 730, it is determined whether there is any content element which has been buffered. If so, at event 732, the voice tag is identified. For example, the buffered audio of the content element at event 710 is identified as the voice tag for the now identified contact record 302. A user confirmation request can be output to the user, and if confirmed by the user, the voice tag is saved in memory at event 733.

As a final check, in some example embodiments (not shown), it can be determined that the command element which was buffered at event 712 is associated with the particular application program. For example, if the original command element was for telephoning, and the application program was the user playing a video game, then no voice tag would be stored based on the user input. On the other hand, if the original command element was for telephoning, and the potential voice tag was generated through operation of a phone application, then the voice tag would be stored. The buffers are then cleared at event 734.

In some example embodiments, at event 728, if the application program command is not successfully executed (e.g. manually terminated, no associated contact record 302, or otherwise fails), then no voice tag is generated. For example, the user may accidentally type in the wrong contact field and wish to end the application program. The user may also initially confirm an action such as selecting "Send" to initiate a telephone or message communication, but then manually prematurely end the operation of the application program within a specified time period, such as three seconds, of the confirming. Upon any of these failures, at event 734 the buffers are cleared and the operating mode can once again return to the application program user interface 724. At this stage, the user can operate the application program of the device as normal, or exit to return to the home user interface 704, etc. At event 730, if no audio content element has been buffered, then the buffers are cleared at event 734, and no voice tag is generated or stored.

Therefore, some example embodiments may only consider the immediate next entered user input command through the application program for identifying the potential voice tag. Subsequent user inputs would not be considered for potential voice tags, as the buffer have been cleared at event 734.

In some example embodiments, referring to events 719 or 733, after a potential voice tag is identified based on the user operation, a user prompt may be output to the user to request final confirmation of whether the voice tag is to be stored in memory. In some example embodiments, if a voice tag already exists for the contact record 302, the user prompt may default to not overwriting the existing voice tag, or in other example embodiments further advise the user that generation of the voice tag would overwrite the existing voice tag. In some example embodiments, the voice tag is automatically generated and saved as a background function, based on predetermined settings and defaults, without any further user prompting.

The variations described with respect to the method 600 of FIG. 6 can be similarly applied to the method 700 of FIG. 7, as appropriate, and vice-versa.

While some example embodiments have been described as being primarily performed by the mobile device 201, it would be appreciated that some steps may be performed a server device (not shown); for example, for resource intensive off-site processing. The off-site server device may contain a library of aggregate information which can be better equipped to disambiguate received voice inputs.

While some of the present embodiments are described in terms of methods, a person of ordinary skill in the art will understand that present embodiments are also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the example embodiments, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

The invention claimed is:

1. A method for automatically identifying voice tags on an electronic device configured to execute at least a voice interface program and a non-voice interface application program, the method comprising:
    receiving, through the voice interface program, a voice input command that includes a command element and a content element;
    identifying from the voice input command the command element;
    storing the command element in a buffer;
    ending the voice interface program without performing the voice input command;
    receiving, through the non-voice interface application program, a user input which identifies input command data for executing an application program command; and
    upon successful execution of the application program command:
        determining that the non-voice interface application program is associated with the command element which was buffered in the buffer, and
        identifying audio of at least the content element or the entire voice input command as a voice tag associated with the input command data identified by the user input.

2. The method as claimed in claim 1, wherein the content element comprises at least part of a contact name.

3. The method as claimed in claim 1, wherein the command element comprises a command for initiating a communication.

4. The method as claimed in claim 1, wherein the non-voice interface application program receives the user input through a visual user interface.

5. The method as claimed in claim 1, further comprising, after ending the voice interface program, automatically opening the non-voice interface application program on the electronic device based on the received command element.

6. The method as claimed in claim 1, wherein receiving the user input is unprompted by the voice interface program.

7. The method as claimed in claim 1, further comprising presenting the identified audio as a potential voice tag to an output interface, and receiving user confirmation through an input interface that the voice tag is to be stored in memory.

8. The method as claimed in claim 1, further comprising storing the voice tag in the memory in association with the input command data identified by the user input.

9. The method as claimed in claim 1, wherein the voice tag is further associated with a type of audio input device used to receive the voice input command.

10. The method as claimed in claim 1, further comprising, after receiving the voice input command, storing the audio of the content element in a memory buffer.

11. The method as claimed in claim 1, wherein ending the voice interface program is caused by failed execution of the voice input command.

12. The method as claimed in claim 1, wherein the user input is received from at least one of a keyboard, mouse, trackball, scrollball, scrollwheel, touch screen, touch pad, and light pen.

13. The method as claimed in claim 1, wherein the non-voice interface application program is a messaging application.

14. An electronic device, comprising:
    a processor configured to execute at least a voice interface program and a non-voice interface application program;
    memory including a buffer and operably coupled to the processor;
    an input interface including an audio input interface; and
    an output interface;
    the processor further configured to:
        receive, through the voice interface program, a voice input command that includes a command element and a content element,
        identify from the voice input command the command element,
        store the command element in the buffer,
        end the voice interface program without performing the voice input command,
        receive, through the application program, a user input which identifies input command data for executing an application program command, and
        upon successful execution of the application program command:
            determine that the non-voice interface application program is associated with the command element which was buffered in the buffer, and
            identify audio of at least the content element or the entire voice input command as a voice tag associated with the input command data identified by the user input.

15. The electronic device as claimed in claim 14, wherein the content element comprises at least part of a contact name.

16. The electronic device as claimed in claim 14, wherein the command element comprises a command for initiating a communication.

17. The electronic device as claimed in claim 14, wherein the non-voice interface application program receives the user input through a visual user interface.

18. The electronic device as claimed in claim 14, wherein the processor is further configured to, after ending the voice interface program, automatically open the non-voice interface application program on the electronic device based on the received command element.

19. The electronic device as claimed in claim 14, wherein receiving the user input is unprompted by the voice interface program.

20. The electronic device as claimed in claim 14, wherein the processor is further configured to present the identified audio as a potential voice tag to the output interface, and receive user confirmation through the input interface that the voice tag is to be stored in the memory.

21. The electronic device as claimed in claim 14, wherein the processor is further configured to store the voice tag in the memory in association with the input command data identified by the user input.

22. The electronic device as claimed in claim 14, wherein the voice tag is further associated with a type of audio input device used to receive the voice input command.

23. The electronic device as claimed in claim 14, wherein the memory comprises a memory buffer, wherein the processor is further configured to, after receiving the voice input command, store the audio of the content element in the memory buffer.

24. The electronic device as claimed in claim 14, wherein ending the voice interface program is caused by failed execution of the voice input command.

25. The electronic device as claimed in claim 14, further comprising at least one of a keyboard, mouse, trackball, scrollball, scrollwheel, touch screen, touch pad, and light pen for receiving the user input.

26. The electronic device as claimed in claim 14, wherein the non-voice interface application program is a messaging application.

27. A non-transitory computer readable medium having instructions stored thereon which, when executed by a processor on an electronic device configured to execute at least a voice interface program and a non-voice interface application program, causes the electronic device to:
    receive, through the voice interface program, a voice input command that includes a command element and a content element;
    identify from the voice input command the command element;
    store the command element in a buffer;
    end the voice interface program without performing the voice input command;
    receive, through the application program, a user input which identifies input command data for executing an application program command; and
    upon successful execution of the application program command:
    determine that the non-voice interface application program is associated with the command element which was buffered in the buffer, and
    identify audio of at least the content element or the entire voice input command as a voice tag associated with the input command data identified by the user input.

* * * * *